United States Patent [19]

Guillou

[11] 4,323,921
[45] Apr. 6, 1982

[54] SYSTEM FOR TRANSMITTING INFORMATION PROVIDED WITH MEANS FOR CONTROLLING ACCESS TO THE INFORMATION TRANSMITTED

[75] Inventor: Louis C. Guillou, Bourgbarre, France

[73] Assignees: Etablissement Public de Diffusion dit "Telediffusion de France", Montrouge; L'Etat Francais, represente par le Secretaire d'Etat aux Poste et Telecommunications (Centre National d'Etudes des Telecommunications), Issy les Moulineaux, both of France

[21] Appl. No.: 114,555

[22] Filed: Jan. 23, 1980

[30] Foreign Application Priority Data

Feb. 6, 1979 [FR] France .................. 79 02995

[51] Int. Cl.³ ................................ H04L 9/00
[52] U.S. Cl. ................... 358/114; 358/86; 358/141; 178/22.08; 178/22.09; 455/2
[58] Field of Search .............. 358/86, 114, 141, 142; 340/147 LP, 149 A, 149 R, 152 R, 152 T, 706; 455/2

[56] References Cited
U.S. PATENT DOCUMENTS 3,934,079  1/1976  Barnhart ........................ 358/86
3,956,615  5/1976  Anderson et al. ............. 340/152 R
3,997,718 12/1976  Ricketts .......................... 455/2
4,081,832  3/1978  Sherman ...................... 358/122
4,214,230  7/1980  Fak et al. ..................... 340/149 A Primary Examiner—Howard A. Birmiel

[57] ABSTRACT

A system for transmitting information between an emitting center and receiving stations, comprising: a subscription administration center generating a plurality of subscriber's keys $C_i$ changing randomly at relatively long intervals of the order of a month; in the emitting center: a generator of an operating key K changing randomly at relatively short intervals of the order of a few minutes; a circuit for forming messages $M_i$ obtained from said subscriber's keys $C_i$ and from the operating key K by means of an algorithm, all the messages $M_i$ then being directed towards the emitting center; and automatic encryption means using the operating key K, in each receiving station: a subscription holder on which is recorded a signal corresponding to at least one of the subscriber's keys $C_i$; a circuit for restoring the operating key receiving the messages $M_i$ and the subscriber's key $C_i$, this circuit working out an algorithm for restoring the signal corresponding to the operating key K used in the emitting center; an automatic decryption means; and at least one charging station capable of temporarily receiving the subscription holders and permanently recording one of the subscriber's key $C_i$ thereon.

5 Claims, 3 Drawing Figures

SYSTEM FOR TRANSMITTING INFORMATION PROVIDED WITH MEANS FOR CONTROLLING ACCESS TO THE INFORMATION TRANSMITTED

BACKGROUND OF THE INVENTION

This invention relates to a system for transmitting information between an emitting centre and receiving stations, this system being provided with means for controlling access to the information transmitted.

The invention can be used in the transmission and display of information on television receivers for purposes of entertainment, information or education. It can advantageously be applied to system of video broadcast by means of which alphanumerical information organised into pages and magazines can be put into television lines, or to interactive video broadcast system which affords access to data bases (general information, directories, etc.) and to interactive services (transactions, messages, education) through the telephone system, or to system which permits, via a data distribution line, the telecontrol, from an emitter source, of the action of recording a preselected television programme by means of receiving equipment (such as a video tape recorder, for example).

For the distribution of information, these three systems use a method of distribution in bundles, compatible with the distribution of the television signal.

The advent of services of these types raises the question of their taxation, i.e. the implementation of a system by means of which the audiences can be identified and monitored. This question arises more generally with any broadcast service tending to make the broadcasting systems more viable by better use of the resources.

Taxation of the subscription type constitutes a both flexible and durable relationship between a service and its users. Such a method of taxation is particularly justified in broadcasting.

Taxation of the type based on consumption may also be used; this method of taxation is fundamental for "interactive" systems (where there is a dialogue between the subscriber and the information source; however, it is of secondary importance in broadcasting systems (in which information is transmitted in one direction to the subscribers). There may be intermediate systems known as "quasi-interactive" systems wherein the content of the distribution source is continuously modified to meet the requirements of the users, which are transmitted via a public data network. The advent of new distribution means with a very large capacity, such as satellites, will develop this quasi-interactive method considerably, thus making it necessary to implement a system for controlling access to the information provided.

This problem of access control raises above all the problems of locking up the information when it is broadcast and unlocking it when it is received, and naturally these problems must be resolved in accordance with the specificity of the system which is to be controlled.

BRIEF SUMMARY OF THE INVENTION

The present invention relates precisely to a general means of controlling access to the information, and which can be applied to a large number of information transmitting systems, particularly the three mentioned hereinbefore.

According to the invention, a double key system is essentially used:

an operating key K which enables the information to be locked up; this key changes in random manner at relatively short intervals of the order of a few minutes;

a subscriber's key capable of assuming several values $C_i$ depending on the type of subscription; this key also changes in random fashion but at long intervals, of the order of a month. This subscriber's key is recorded on a subscription holder inserted in each receiver set. Special messages are composed for broadcasting and are transmitted with the data. These messages enable the operating key to be set up in the receiver set and thus open the electronic lock which secures the information transmitted.

More precisely, the invention relates to a system for transmitting information between an emitting centre and receiving stations, the emitting centre comprising a circuit forming signals carrying said information and a means for emitting said signals, each receiving station comprising a means for receiving the signals transmitted and a means for displaying the information, characterised in that it further comprises:

(A) a subscription directing centre generating a plurality of signals constituting subscriber's keys $C_i$, these subscriber's keys changing randomly at relatively long intervals of the order of one month;

(B) in the emitting centre:
   (a) a generator of a signal constituting an operating key K, this key changing randomly at relatively short intervals of the order of a few minutes,
   (b) a circuit for forming messages $M_i$ obtained from the subscriber's keys $C_i$ and the operating key K by an algorithm the parameters of which are provided by the subscriber's keys, i.e. $M_i = F_{C_i}(k)$, this circuit supplying as many messages as there are subscriber's keys, these messages changing with the operating key, after which all the messages $M_i$ are directed towards the emitter means,
   (c) an automatic encryption means using the operating key K, said automatic means receiving signals carrying the information and delivering encrypted signals which are then directed towards the emitter means, (C) in each receiving station:
   (a) a subscription holder on which is recorded a signal corresponding to at least one of the subscriber's keys $C_i$,
   (b) a circuit for reconstituting the operating key receiving on the one hand the messages $M_i$ received and, on the other hand, the subscriber's key $C_i$, this circuit producing an algorithm $K = G_{C_i}(M_i)$ by means of which it is possible to reconstitute the signal corresponding to the operating key K used in the emitting station from the messages $M_i$ received and from the subscriber's key $C_i$,
   (c) automatic decryption means connected, on the one hand, to the receiving means from which it receives the encrypted, signals and, on the other hand, to the reconstituting circuit from which it receives the operating key K, said automatic means decrypting the encrypted signals, by using the operating key, and delivering the decrypted signals which are then directed towards the information display means, (D) at least one station for charging the subscription holders, this station being connected to the subscription directing centre from which it receives the signals corresponding to the different subscriber's keys $C_i$ generated by this centre, each station being capable of temporarily receiving the subscription holders and permanently recording one of the subscriber's keys $C_i$ thereon.

BRIEF DESCRIPTION OF THE DRAWINGS

In any case, the features and advantages of the invention will become more apparent from the following description of some exemplary embodiments given by way of explanation, without being in any way restrictive. This description refers to the accompanying drawings, wherein.

DETAILED DESCRIPTION OF THE PREFERRED EMBODIMENTS

Figure 1:
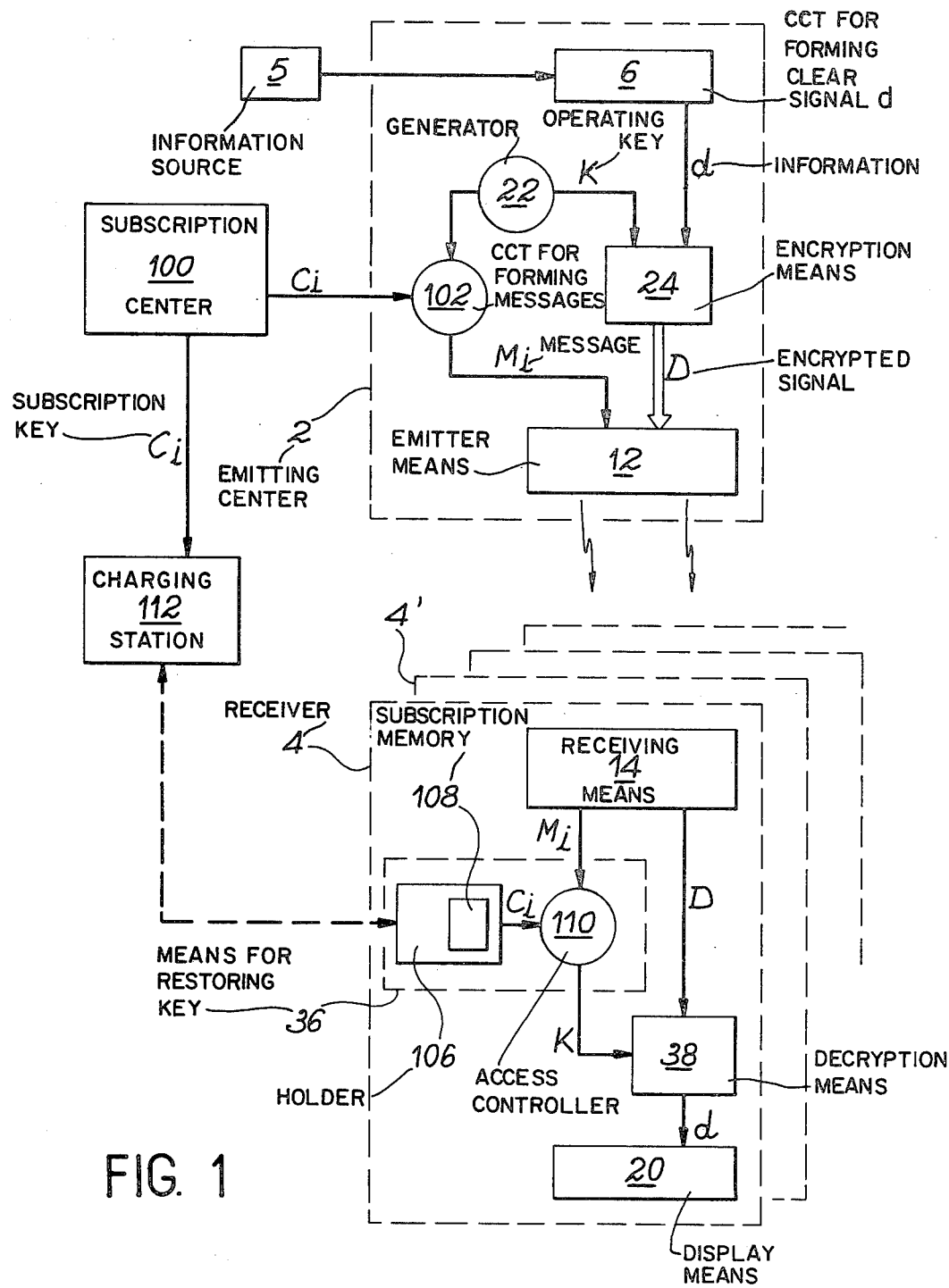
FIG. 1 is a synoptic plan of the system according to the invention.

The system shown in FIG. 1 comprises firstly a subscription directing centre 100 which generates a plurality of signals constituting subscriber's keys $C_i$, these subscriber's keys changing randomly at relatively long intervals of the order of a month.

The transmitting system is organised around an emitting centre 2 which comprises:

(a) a circuit 6 for forming signals d carrying information, (b) a generator 22 of a signal constituting an operating key K, this key changing randomly at relatively short intervals of the order of a few minutes, (c) automatic encryption means 24 using the operating key K; these means receive the signals d carrying the information and deliver encrypted signals D, (d) a circuit 102 for forming messages $M_i$ obtained from the subscriber's keys $C_i$ and from the operating key K by means of an algorithm the parameters of which are provided by the subscriber's keys, i.e. $M_i = F_{C_i}(K)$, this circuit delivering as many messages as there are subscriber's keys; these messages change with the operating key; they are directed towards the emitter means 12.

(e) a means 12 for emitting the information signals and messages.

At the other end, the system comprises receivers, each of which comprises:

(a) a means 14 for receiving the signals transmitted;

(b) a holder 106 which comprises a subscription memory 108 in which is recorded a signal corresponding to at least one of the subscriber's keys $C_i$, (c) a circuit 110 for reconstituting the operating key; this circuit receives, on the one hand, the messages $M_i$ and, on the other hand, the subscriber's key $C_i$; this circuit is capable of producing an algorithm $K = G_{C_i}(M_i)$ for reconstituting the signal corresponding to the operating key K used in the emitting station, from the messages $M_i$ received and from the subscriber's key $C_i$, (d) automatic decryption means 38 which are connected, on the one hand, to the receiving means 14 from which they receive the encrypted signals D and, on the other hand, to the reconstituting circuit 110 from which they receive the operating key K; these automatic means use the operating key and decrypt the encrypted signals D; they deliver the decrypted signals d which are then directed to (e) display means 20 consisting of a display tube, for example.

The system shown also comprises at least one charging station 112 for the subscription holders, this station being connected to the subscription directing centre 100 from which it receives the signals corresponding to the different subscriber's keys $C_i$ generated by this centre; each station 112 is capable of temporarily receiving subscription holders and permanently recording one of the subscriber's keys $C_i$ in their memories 108.

To illustrate the operation of this double key system, one can take the example of a subscription plan using four types of subscription: 1 month, 3 months, 6 months and a year. In addition to its duration, a subscription is characterised by the month in which it starts. With a plan of this kind, in a given month and for a given service, there are thus 22 subscriber's keys which may be used by the users: a monthly key, three three-monthly keys, six six-monthly keys and twelve yearly keys.

Each month, the taxation administration centre 100 provides each emitting centre 2 with a list of 22 subscriber's keys $C_i$ in use for each service distributed by this centre. In addition, it supplies the charging stations 112 with another list of 4 keys to start in the following month (one month, three months, six months and one year), for each service, with the prices of the subscriptions.

A suitable machine installed in each sales point records some of these keys in the form of blocks of subscriptions in the memories 108 of the holders. These holders may, for example, be information-bearing cards of the credit card type. These cards are then inserted into the receiving station 4 by the users of the service.

For each paying service, approximately every five minutes a new operating key K is generated at random by each distribution centre in question. Thus, in the course of a session of a service (one hour or several hours), there may be several dozen operating keys following one after another.

As soon as a distribution centre generates a new operating key K, it calculates, for each subscriber's key $C_i$ being used for this service, a message $M_i$, by means of an algorithm $M_i = F_{C_i}(K)$, with the keys $C_i$ acting as parameters.

Thus, for a service having the subscription plan indicated above, at any one time there are 22 different messages in force. The duration of a message is equal to that of the operating key K and for a given service, at any one time, there are as many messages as there are current subscriber's keys.

All the messages $M_i$ in force together constitute the access-controlling information associated with the service being broadcast.

Figure 2:
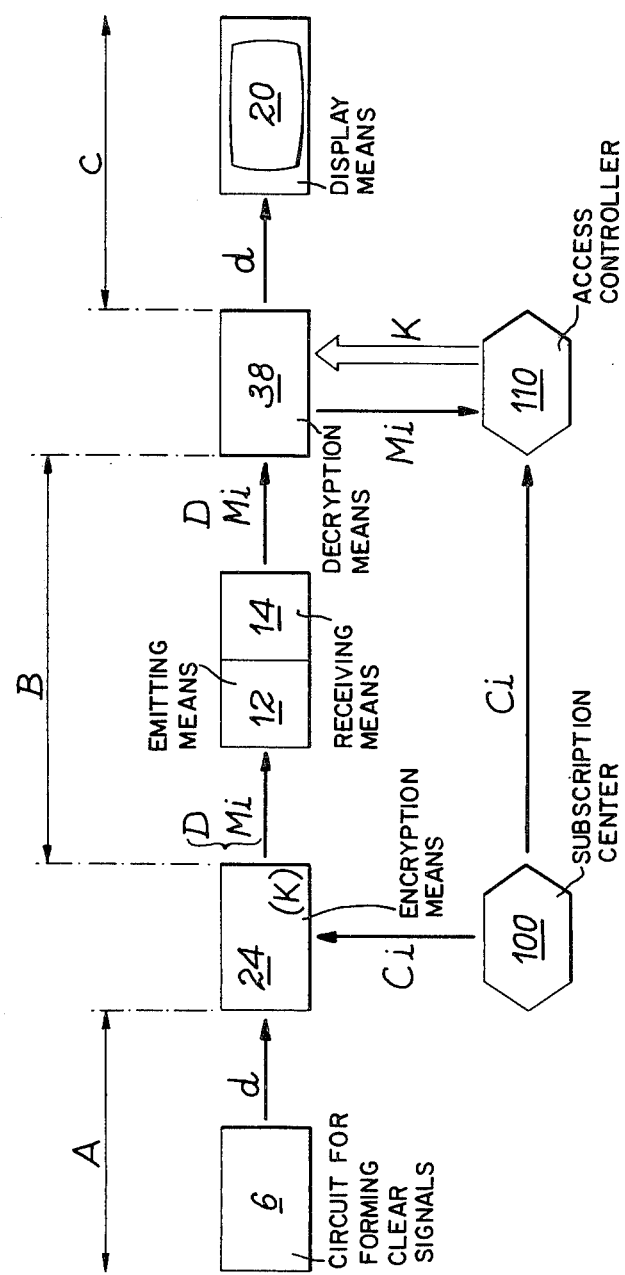
FIG. 2 is a diagram illustrating the fluxes of information in the system shown in the previous figure.

FIG. 2 shows a diagram of the fluxes of information in the system according to FIG. 1. The parts shown in the first figure have the same reference numerals in the second, i.e. the source 6 of clear signals d, the automatic encryption means 24 which deliver the encrypted signals D, the emitting and receiving means 12 and 14; the decryption circuit 38 which delivers the decrypted signals d, the display means 20, the subscription administration centre 100 and finally the access controller 110 or subscription card.

In zone A, upstream of the encrypting means, the information is in clear; in zone B, it is encrypted. It is in clear again downstream of the automatic decrypting means 38. The information emanating from the administration centre 100 consists of subscriber's keys $C_i$. The access controller 110, in turn, receives the keys $C_i$ and the messages $M_j$. From them it takes the operating key K required for the unlocking operation.

The invention can advantageously be used in controlling access to the information distributed by television system as described only briefly here.

Figure 3:
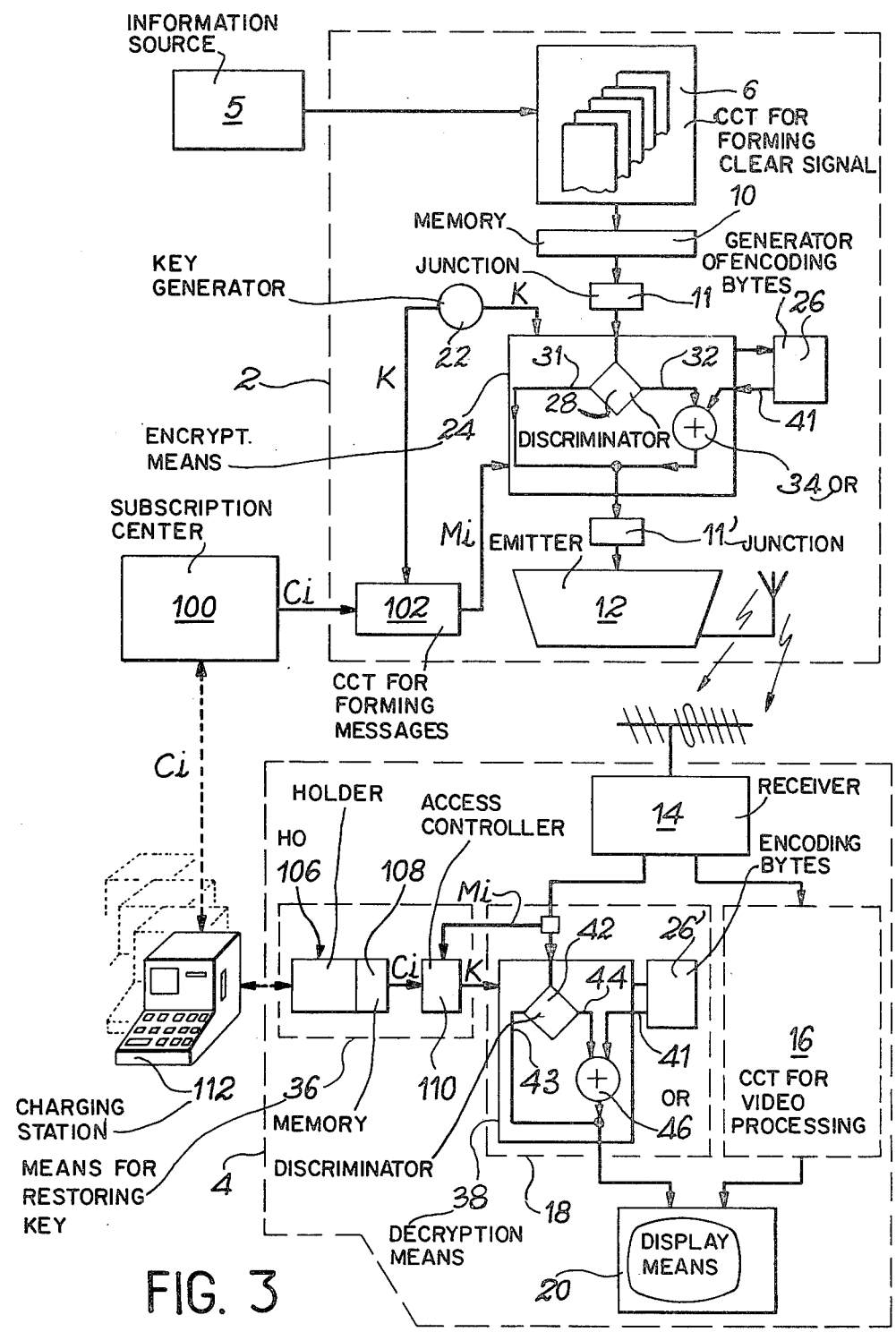
FIG. 3 shows an example of the application of the invention to an ANTIOPE-type videotex system.

The circuit in FIG. 3 comprises means already shown in FIG. 1 and for the sake of simplicity these means have the same reference numerals. The circuit also comprises:

(A) in the emitting centre:

a circuit 10 for memorising a magazine composed by the circuit 6, this magazine comprising pages organised in rows and two junctions 11 and 11' between which is inserted an automatic encryption means 24. The automatic encryption means comprises:

(i) discriminator 28 with an input connected to the magazine memorising circuit 10 from which it receives clear eight-bit bytes; among these clear eight-bit bytes, this discriminator is able to distinguish those wherein the 7th and 6th binary elements are zero, which are the controlling eight-bit bytes; this discriminator comprises two outputs 31 and 32, the first of which carries the eight-bit bytes having zero 7th and 6th binary elements and which is connected to the distribution multiplexer 12 (through junction 11'), and the second of which carries the clear eight-bit bytes d whose 7th and/or 6th binary elements are not zero;

(ii) a logic circuit 34 of the OR-exclusive type with two inputs, one of which is connected to the second output 32 of the discriminator 28 from which it receives the clear eight-bit bytes having 6th and 7th binary elements which are not zero; this logic circuit has an output which carries the odd-numbered encoded bytes D which are then directed (through junction 11') towards the distribution multiplexer 12.

The emitting centre also comprises a generator 26 of encoding eight-bit bytes controlled by the automatic means 24 from which it receives eight-bit bytes indicating the page numbers and line numbers of the data to be transmitted and the signal corresponding to the operating key K; this eight-bit byte generator 26 delivers, for each eight-bit data byte of a displayable line, an encoding eight-bit byte $C_j$, the latter having an even-numbered 8th binary element and 7th and 6th binary elements of zero, this eight-bit byte being applied to the second input of the OR-exclusive circuit 34.

(B) in each receiving station:

a line 16 for processing video picture signals, in parallel with the automatic decryption means 38. The latter means comprises:

(i) a discriminator 42 with an input receiving encrypted eight-bit bytes; this discriminator is capable of distinguishing, among these numbered bytes, those wherein the 7th and 6th binary elements are zero; this comparator has two outputs 43 and 44, the first of which carries these bytes wherein the 7th and 6th binary elements are zero, this first output being connected to the display means 20, whilst the second output carries the encrypted eight-bit bytes $D_j$ where the 7th and 6th binary elements are not zero.

(ii) a logic circuit 46 of the OR-exclusive type with two inputs, one connected to the output 44 of the discriminator from which it receives the encrypted eight-bit bytes D, this logic circuit having an output which carries the decrypted eight-bit bytes d which are then directed towards the display means 20.

(iii) a generator of decoding eight-bit bytes, controlled by the automatic decryption means from which it receives the eight-bit bytes indicating the page numbers and line numbers of the data transmitted, and signal corresponding to the current operating key K; this generator of decoding eight-bit bytes has an output 41 which delivers, for each encrypted byte received, a decoding eight-bit byte having a heavy binary element which is forced to zero and 7th and 6th binary elements equal to zero, these eight-bit bytes being applied to the second input of the gate 46.

The formation of messages $M_i$ from the subscriber's keys $C_i$ and from the operating key K may advantageously be effected as follows:

The circuit 102 of the emitting centre is organised around a microprocessor programmed to implement an algorithm which is based on two Galois fields having the Mersenne primary numbers $2^{61}-1$ and $2^{127}-1$ as their characteristics. This algorithm uses subscriber's keys $C_1$ of 128 binary elements and an operating key K of 56 binary elements, in the following manner:

(1) a confusion redundancy word $\pi$ is formed, comprising 61 binary elements generated at random each time the algorithm is implemented;

(2) $\pi^{-1}$, the inverse of $\pi$ modulo $2^{61}-1$, is calculated by an arithmetical programme using a variant of Euclid's algorithm;

(3) a first multiplication by another arithmetical programme: $\mu = K \cdot \pi^{-1}$, modulo $(2^{61}-1)$, is carried out;

(4) $\gamma$, the inverse of C modulo $2^{127}-1$, is calculated by a programme similar to that in (2);

(5) finally, the message is calculated by a programme similar to (3): $M = \gamma \cdot (\nu + 2^{64} \cdot \pi)$ modulo $(2^{127}-1)$.

When the messages have been thus formed, the algorithm to be worked out in the circuit 110 for reconstituting operating key K from a message $M_i$ and a subscriber's key $C_i$ is as follows:

1. The message $M_i$ (127 useful binary elements) is taken octet by octet and multiplication by $C_i$ is carried out on the first body CG $(2^{127}-1)$. Thus, a word $\mu$ is formed:

$$\mu = M \cdot C \text{ modulo } (2^{127}-1)$$

According to the construction of M on emission, the binary elements 1 to 61 of $\mu$ represent the word $\nu$, whilst binary elements 65 to 125 represent the word $\pi$. Obviously, binary elements 62, 63, 64, 126 and 127 should be zero. If they are not, the word $\nu$ is brought to zero before continuing the calculation.

2. $\pi$ and $\nu$ are multiplied on the second field CG $(2^{61}-1)$, thus eliminating the redundancy of confusion, and $K = \nu \cdot \pi$ modulo $(2^{61}-1)$ is obtained.

3. The 56 useful binary elements of K are then put into the form of eight odd eight-bit bytes.

The invention is not limited to the embodiments described and represented hereinbefore and various modifications can be made thereto without passing beyond the scope of the invention.

I claim:

1. A system for transmitting information between an emitting center and receiving stations, the emitting center comprising a circuit for forming signals carrying said information and means for emitting said signals, each receiving station comprising means for receiving the signals transmitted and means for displaying the information, wherein it also comprises:

(A) a subscription administration center generating a plurality of signals constituting subscriber's keys $C_i$, these subscriber's keys changing randomly at relatively long intervals of the order of a month;

(B) in the emitting center:
 (a) a generator of a signal constituting an operating key K, this key changing randomly at relatively short intervals of the order of a few minutes,
 (b) a circuit for forming messages $M_i$ obtained from said subscriber's keys $C_i$ and from the operating key K by means of an algorithm the parameters of which are provided by the subscriber's keys, namely $M_i = F_{C_i}(K)$, this circuit delivering as many messages as there are subscriber's keys, these messages changing with the operating key, all the messages $M_i$ then being directed towards the emitter means,
 (c) an automatic encryption means using the operating key K, this automatic means receiving signals carrying the information and delivering encrypted signals which are then directed towards the emitter means, (c) in each receiving station:
 (a) a subscription holder on which is recorded a signal corresponding to at least one of the subscriber's keys $C_i$,
 (b) a circuit for restoring the operating key, receiving on the one hand the messages $M_i$ received and, on the other hand, the subscriber's key $C_i$, this circuit working out an algorithm $K = G_{C_i}(M_i)$ for restoring the signal corresponding to the operating key K used in the emitting station from the messages $M_i$ received and from the subscriber's key $C_i$,
 (c) an automatic decryption means which is connected, on the one hand, to the receiving means from which it receives the encrypted signals and, on the other hand, to the restoring circuit from which it receives the operating key K, this automatic means decrypting the encrypted signals, by using the operating key, and delivering decrypted signals which are then directed towards the information display means, (D) at least one charging station for the subscription holders, this station being connected to the subscription administration center from which it receives the signals corresponding to the different subscriber's keys $C_i$ generated by this center, each station being capable of temporarily receiving the subscription holders and permanently recording one of the subscriber's key $C_i$ thereon.

2. An information transmitting system according to claim 1, wherein the signals corresponding to the subscriber's keys $C_i$, to the operating key K and the messages $M_i$ are all of the binary numerical type.

3. An information transmitting system according to claim 1, wherein the transmitting means use a television channel.

4. An information transmitting system according to claim 1, further comprising means for inserting onto television lines alphanumerical informations organized into pages and magazines.

5. An information transmitting system according to claim 4, comprising means for organising all the messages $M_i$ into a special page and for cyclically transmitting this page in clear to receiving stations, this page not being displayable.

* * * * *